Jan. 27, 1959 W. E. KOENIG 2,870,653
JUICE EXTRACTOR

Filed March 10, 1955 2 Sheets-Sheet 1

INVENTOR.
WILLIAM E. KOENIG
BY
Townsend, Townsend and Hoppe
ATTORNEYS

Jan. 27, 1959
W. E. KOENIG
2,870,653
JUICE EXTRACTOR
Filed March 10, 1955
2 Sheets-Sheet 2
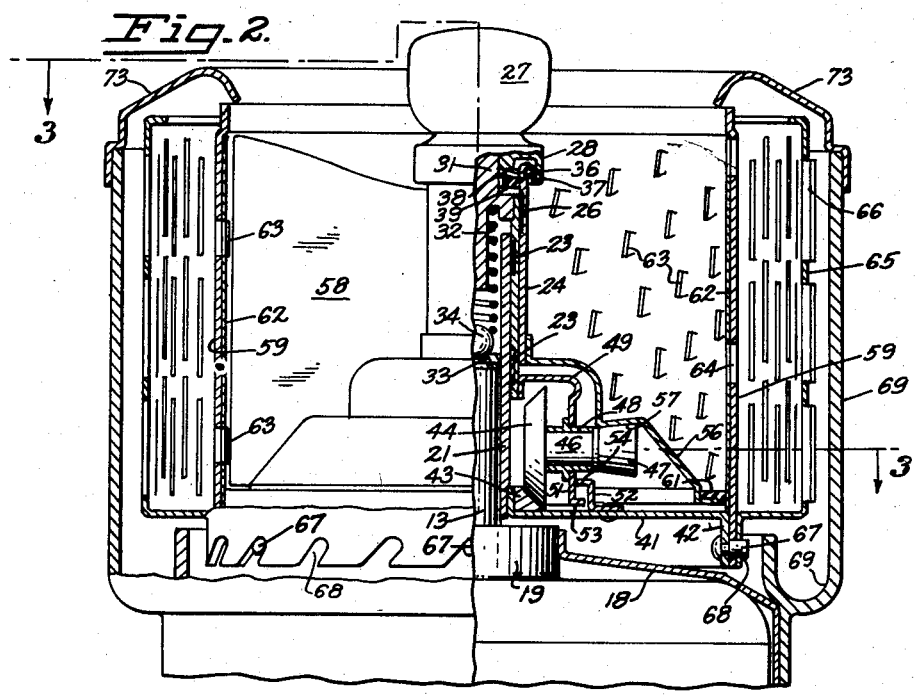
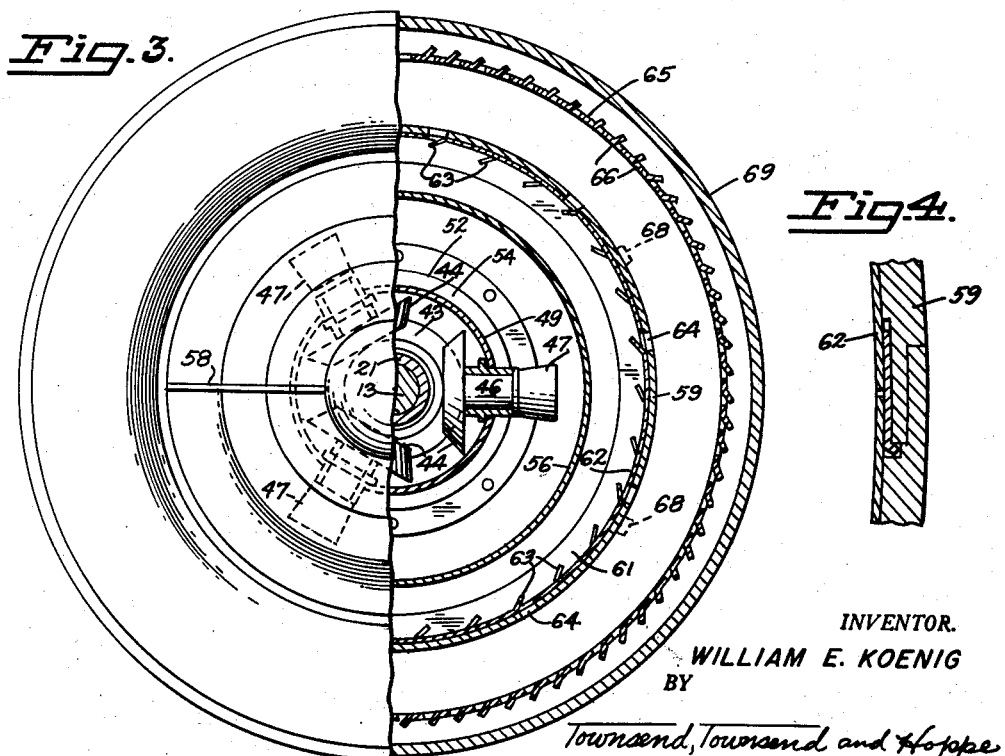
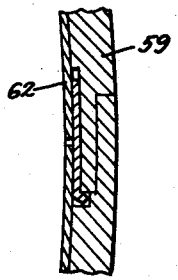
INVENTOR.
WILLIAM E. KOENIG
BY
Townsend, Townsend and Hoppe
ATTORNEYS United States Patent Office 2,870,653
Patented Jan. 27, 1959

2,870,653

JUICE EXTRACTOR

William E. Koenig, Menlo Park, Calif.

Application March 10, 1955, Serial No. 493,528

2 Claims. (Cl. 74—721)

This invention relates to a new and improved juice extractor, which is particularly useful in extracting the juices from vegetables, fruits, and the like.

The present invention is characterized by the provision of a vertical spindle which is motor-driven and supports a horizontally extending, radial vane, the vane rotating inside a cylindrical member which also rotates in a direction opposite to that of the vane and which is provided with a plurality of cutter lips which function to shred the fruit or vegetable deposited in the open upper mouth of the cylindrical cutter. The counter-rotation of the vane and cutter cylinder function effectively and rapidly to shred the material deposited inside the cutter. Outside the cutter cylinder is an annular chamber, in the outer walls of which are a plurality of slits, which functions to trap the shredded material and to permit the juice to escape by centrifugal action. The escaping juice is collected in an urn surrounding the member, and is provided with a pouring lip.

One of the features and advantages of the present invention is the fact that the speed of rotation of the vane relative to the cutter cylinder may be varied by manual control so as to accommodate the extractor to materials of different characteristics. For this purpose, a plurality of beveled rollers is provided which contact the member driving the cutter cylinder and the member supporting the vane in such manner that the one is caused to rotate in a direction opposite that of the other. By varying the pressure on the tapered rollers, the amount of relative slippage can be adjusted and hence the speed controlled.

Another feature of the invention is the provision of removable cutter lips by a particular construction thereof which permits replacement of the cutter lips as they become dull with usage without replacing the remainder of the apparatus.

Still another feature of the invention is the provision of a convenient means for withdrawing the vane, cutter cylinder and collecting member for cleaning, as required.

Other objects of the present invention will become apparent upon reading the following specification and referring to the accompanying drawings in which similar characters of reference represent corresponding parts in each of the several views.

In the drawings:

Fig. 2 is a vertical mid-sectional view of a portion of the device with certain parts partially broken away and showing the control knob depressed for engagement of the rotary vane;

Fig. 3 is a top plan view partially broken away in section along the line 3—3 of Fig. 2; and Fig. 4 is an enlarged fragmentary, horizontal sectional view showing the construction of the cutter cylinder at the joint of the cylindrical portions thereof.

Figure 1:
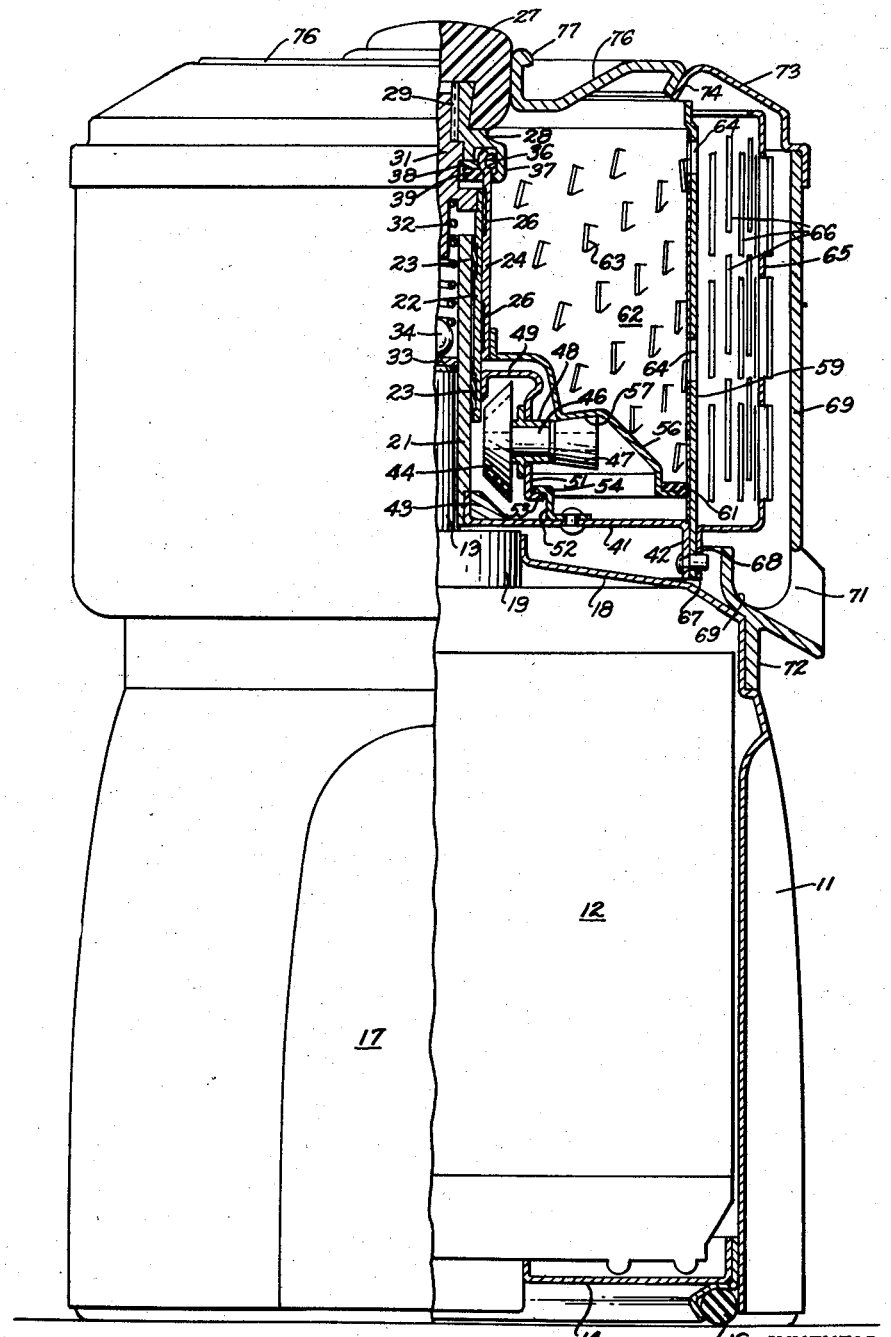
Fig. 1 is a side elevational view partly broken away in vertical section showing the device with the control knob elevated by spring pressure to permit slippage of the vane relative to the cutter cylinder.

The juice extractor which is the subject of this invention may be supported by a vertically extending casing 11 containing a motor 12 having its shaft 13 vertical and extending upward. The motor 12 is supported within the casing 11 by means of a retainer 14 which closes off the bottom end of the casing 11, and which is provided with a rubber ring 16 on its bottom surface, which ring engages the surface on which the extractor is deposited and prevents slippage of the extractor over the supporting surface. As illustrated in the accompanying drawings, Fig. 1, a plurality of radially extending protuberances 17 on the exterior of the casing provides a convenient grip for the user. The upper surface of the casing 11, which is distinguished by reference numeral 18 in the accompanying drawings, prevents liquids from entering the motor 12 and is sealed against the boss 19 at the upper end of the motor through which the shaft 13 projects. Surrounding the upper end of the shaft 13 and rotatable therewith is a sleeve 21, which is in turn surrounded by an intermediate sleeve 22 with nylon sleeve bearings 23 interposed between the inner sleeve 21 and intermediate sleeve 22. The intermediate sleeve 22 is, in turn, surrounded by an outer sleeve 24 with nylon sleeve bearings 26 interposed between the intermediate sleeve 22 and outer sleeve 24.

Concentric with and positioned above the motor shaft 13 is a control knob 27 having a hub 28 on its lower end which is keyed by means of key 29 to spindle 31 which is fixed to intermediate sleeve 22. A spring 32 is interposed between spindle 31 and nylon thrust bearing 33 which rests directly upon the upper end of shaft 13. A ball 34 is positioned immediately above thrust bearing 33 and prevents frictional engagement between the lower end of the spindle 31 and the bearing 33. Sealing gasket 36 is placed between the upper end of the outer sleeve 24 and cylindrical projection 37 on the lower end of hub 28 to seal these two members together. Annular thrust bearing 38 is interposed between the lower end of hub 28 and an annular inwardly projecting flange 39 on the upper end of outer sleeve 24. Thus outer sleeve 24 may revolve relative to stationary knob 27 and hub 28. As is apparent by comparison between Figs. 1 and 2, downward pressure on knob 27 causes the intermediate sleeve 22 and outer sleeve 24 to move downward relative to sleeve 21 and motor shaft 13. Release of manual pressure on the knob 27 causes spring 32 to raise sleeves 22 and 24.

Inner sleeve 21 carries annular, substantially horizontal disk 41 or first driven member having downwardly projecting cylindrical flange 42 on its outer rim. At the inner edge of disk 41 adjacent its juncture with sleeve 21 is a wedge-shaped friction member 43 which engages a bevelled friction wheel 44 having a spindle 46 on the opposite end of which is a second bevelled friction wheel 47. Spindle 46 is enclosed within and supported by bearing member 48 which is, in turn, supported by cage member 49 fixed to the lower end of intermediate sleeve 22. There are a plurality of spindles 46 with a corresponding plurality of bevelled friction members 44 and 47, and in the preferred embodiment of the invention illustrated in the accompanying drawings, there are three such spindles 46 equi-angularly spaced. Bevelled friction wheel 44 is so positioned that when the knob 27 is depressed to the position shown in Fig. 2, the conical surface of member 44 engages the mating conical surface of friction member 43 on disk 41 and causes rotation of spindle 46 and outer bevelled friction wheel 47. The spindle 46 raises and lowers with the knob 27. To prevent escape of fluids, and contamination, a pair of cooperating closure members 51 and 52 are attached respectively to the cage member 49 and disk 41. Members 51 and 52 are annular in configuration and have cooperating oppositely directed flanges 53 and 54, respectively. Members 44 and 47 are rubber-clad on their conical working surfaces.

Affixed to the lower end of outer sleeve 24 is a downwardly and outwardly diverging hollow member 56 having an annular frictional surface 57 which mates with the conical working surface of the tapered frictional wheel 47 so that member 56 revolves in an opposite direction from spindle 46 whenever tapered wheel 44 is in engagement with surface 43. Pressure on knob 27 regulates the slippage of member 44 relative to member 43 and hence regulates the speed of rotation of member 56 relative to member 41. At least one radially outwardly projecting thin vane 58 or second driven member is fixed for rotation with member 56 and the function of the control knob 27 is to regulate the speed of rotation of the vane 58.

Surrounding the peripheral flange of the hollow member 56 is a cylindrical drive cylinder 59 with an annular sealing gasket 61 interposed therebetween. The upper end of cylindrical drive member 59 is open for the reception of the material from which the juice is to be extracted. The inner surface of the drive cylinder 59 is lined with a thin, stainless steel cutter cylinder 62 which revolves therewith. The cutter cylinder 62 is formed with a large plurality of cutter lips 63 formed by inwardly pressed wedge-shaped notches formed in the cylinder 62. For each lip 63 there is a corresponding hole 64 in registry therewith, so that material shredded by the cutter 63 passes outwardly of the drive cylinder 59 through the aperture 64. Surrounding the drive cylinder 59 is a centrifugal rotor member 65 which revolves with the drive cylinder 59 and cutter cylinder 62 and is provided with a plurality of thin vertical slits 66, which provide for the escape of liquid but are narrow enough to trap the shredded, solid material therebetween. Rotor 65 and drive cylinder 59 revolve with the disk 41. However, the members 65 and 59 are removable for cleaning purposes. The driving connection is afforded by means of a plurality of radially outwardly extending pins 67 in the cylindrical flange 42 of disk 41, which pins engage bayonet slots 68 in the lower skirt of members 65 and 59. By twisting and upward movement, the members 59 and 65 may be withdrawn as a unit from the interior of the machine.

Surrounding rotor 65 is an outer collecting urn 69 having a pouring lip opening 71 having a location on its lower end. Urn 69 has a depending skirt 72 which fits against and is supported by the upper end of the casing 11. The upper end of urn 69 is provided with an upwardly and inwardly projecting annular rim forming member 73, the inner edge of which is of slightly lesser diameter than the drive cylinder 59. The space between the inner lip 74 of the rim 73 and the knob 27 is closed off by an irregular-shaped annular lid 76 which may be removed by means of fingerholds 77 to permit material to be placed inside the cutter cylinder 62.

In use, the lid 76 is removed and material deposited inside the cutter cylinder 62. The lid 76 is then replaced. The motor is started by a switch (not shown). This results in rotation of disk 41 and corresponding rotation of cylinder 59, cutter cylinder 62 and centrifugal rotor 65, the last three members all rotating in the same direction. As pressure is applied to knob 27, tapered roller 44 comes in contact with wedge member 43, causing member 47 to revolve and this causes member 56 and vane 58 to revolve in a direction opposite that in which cutter cylinder 62 revolves. The relative speed of the vane may be controlled by the amount of pressure on the knob 27. The material inside the cylinder 59 is brought in contact with the cutter cylinder 62 by a combination of centrifugal force and the rotation of vane 58. The multitude of cutter lips shreds the material, which then passes through the registering hole 64 in the drive cylinder. The material and juice pass into the annular space between the drive cylinder 59 and the centrifugal rotor member 65. The juice passes out through the narrow slit 66 into the urn 69 where all the solid material is trapped in the annular space referred to. By reason of the centrifugal force imparted by rotation of the cylinder 59, the juice is substantially entirely extracted. The juice passes out of the urn through the pouring lip opening 71 into a suitable receptacle. As more material is added, the lid 76 is removed and then replaced. When the operation is completed, the entire assembly of drive cylinder 59, and rotor member 65, may be removed by the arrangement of the pins 67 and slot 68, thereby facilitating cleaning of the solid material. The urn 69 may also be removed. As required, vane 58 may be withdrawn by lifting outer sleeve 24.

Although the foregoing invention has been described in some detail by way of illustration and example for purposes of clarity of understanding, it is understood that certain changes and modifications may be practiced within the spirit of the invention and scope of the appended claims.

I claim:

1. A drive for a juice extractor comprising a shaft, a first driven member, a second driven member, said driven members being rotatable in planes transverse to said shaft, a plurality of spindles extending radially transversely of said shaft, means rotatively mounting said spindles for movement toward and away from said first driven member, said spindles each having a first friction surface and a second friction surface, an annular friction member mounted on said first driven member and engageable with said first friction surfaces of said spindles, a hollow member rotatable with said second driven member, said hollow member having a third friction surface engageable with said second friction surfaces, and means manually operable arranged to move said first friction surfaces and said annular friction member toward tighter frictional engagement whereby the speed of said second driven member relative to said first driven member is responsive to the force applied to said last mentioned means.

2. A drive for a juice extractor comprising a shaft, a first driven member, a second driven member, said driven members being rotatable in planes transverse to said shaft, a plurality of spindles extending radially transversely of said shaft, means rotatively mounting said spindles for movement toward and away from said first driven member, a first tapered roller on one end of each spindle and a second tapered roller on the opposite end of each said spindle, an annular friction member mounted on said first driven member and engageable with said first tapered rollers to rotate said spindles as said first driven member revolves, a hollow member engageable with said second driven member, said hollow member having a third friction surface engageable with said second rollers, and means manually operable arranged to move said first tapered roller and said annular friction member toward tighter frictional engagement, whereby the speed of said second driven member relative to said first driven member is responsive to the force applied to said last mentioned means.

References Cited in the file of this patent

UNITED STATES PATENTS

| | | |
|---|---|---|
| 1,852,360 | Mitchell | Apr. 5, 1932 |
| 1,993,337 | Crowe | Mar. 5, 1935 |
| 2,217,144 | Stewart | Oct. 8, 1940 |
| 2,302,138 | Nicholson | Nov. 17, 1942 |
| 2,304,929 | Keith | Dec. 15, 1942 |
| 2,507,614 | Sarland | May 16, 1950 |

FOREIGN PATENTS

| | | |
|---|---|---|
| 143,974 | Australia | Oct. 26, 1951 |